United States Patent [19]

Bliven

[11] Patent Number: 4,866,875
[45] Date of Patent: Sep. 19, 1989

[54] FISHING RIG HOLDER AND METHOD OF USE

[76] Inventor: Herb Bliven, P.O. Box 14-Rt. 2, Paynesville, Minn. 56362

[21] Appl. No.: 155,913

[22] Filed: Feb. 16, 1988

[51] Int. Cl.$^4$ ............................................. A61K 97/06
[52] U.S. Cl. ....................................... 43/57.1; 43/57.2
[58] Field of Search ................................. 43/57.1, 57.2

[56] References Cited

U.S. PATENT DOCUMENTS

| | | |
|---|---|---|
| 742,040 | 10/1903 | Kurtz, Sr. . |
| 2,525,057 | 10/1950 | Anderson . |
| 2,604,721 | 7/1952 | Casciano . |
| 2,667,010 | 1/1954 | Anderson ............................ 43/57.2 |
| 2,804,717 | 9/1957 | Ripperdan . |
| 2,826,856 | 3/1958 | Marion et al. . |
| 2,917,862 | 5/1959 | McCarthy . |
| 3,166,866 | 1/1965 | Norton et al. ......................... 43/57.1 |
| 3,172,228 | 3/1965 | Freeman ............................... 43/57.1 |
| 3,213,564 | 10/1965 | Borell . |
| 3,224,134 | 1/1965 | Holcombe et al. .................. 43/57.1 |
| 3,490,168 | 1/1970 | Posavec . |
| 4,179,834 | 12/1979 | Thomas . |
| 4,700,502 | 10/1987 | McFarland et al. ................. 43/57.1 |

Primary Examiner—Nicholas P. Godici
Assistant Examiner—Karen Skillman
Attorney, Agent, or Firm—Merchant Gould Smith Edell Welter Schmidt

[57] ABSTRACT

A holder for storing and transporting fishing rigs including an extended bar with first and second end pieces attached to the bar. A means for retaining the hook and the knot of the fishing rig is provided on both of the end pieces. The bar has a plurality of extended members which may be removably attached in an end-to-end relationship thereby allowing the holder to receive fishing rigs of various lengths. Further, the holder is made out of non-corrosive material which floats in water.

28 Claims, 1 Drawing Sheet

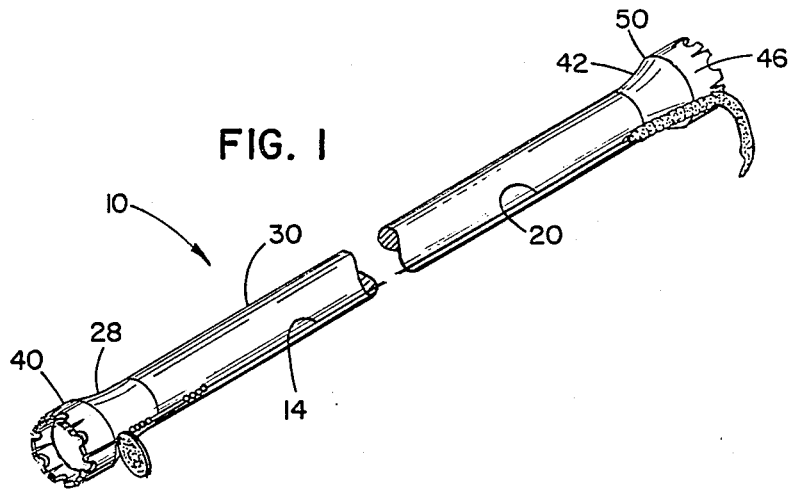
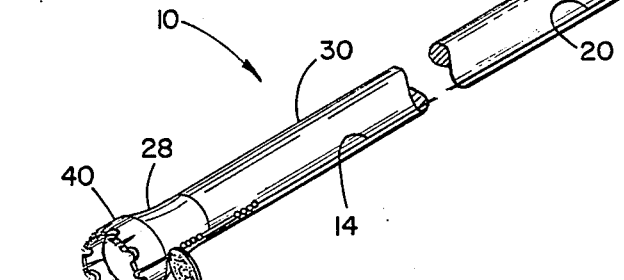
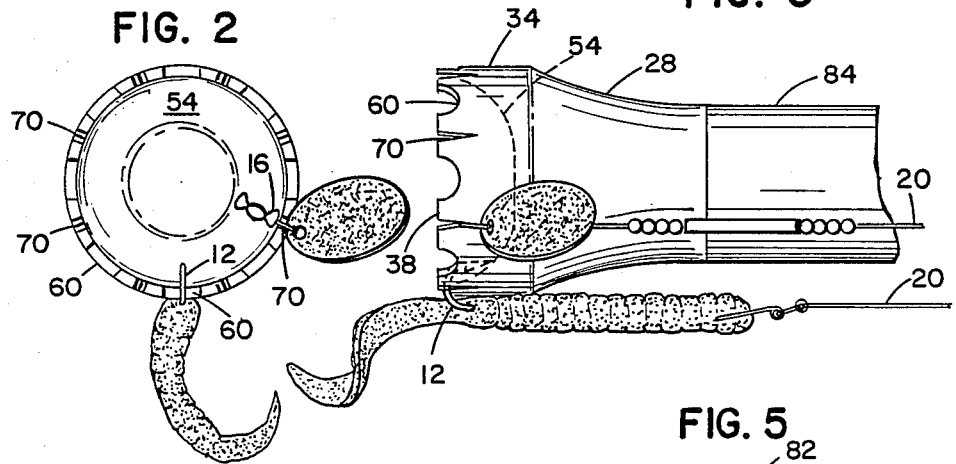
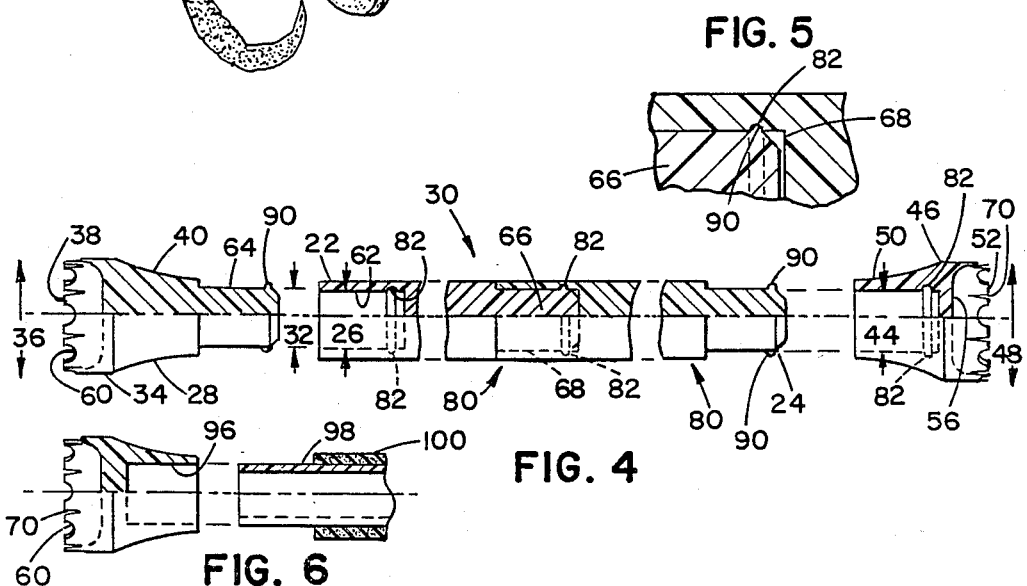

FISHING RIG HOLDER AND METHOD OF USE

TECHNICAL FIELD

This invention relates generally to fishing equipment and more particularly to an improved holder for fishing rigs which is used for the transportation and storage of fishing rigs.

BACKGROUND OF THE INVENTION

Of all fishing accessories, fishing rigs with wire or monofilament leaders have long been dificult to store and to transport. Due to the physical consistency of the leaders, two dificult problems can arise. First, the leaders often become entagled into "bird nest" formations if not securely coiled or held immobile. Second, the wire leaders often become bent or kinked which makes them no longer useful. As a result, considerable time and fishing opportunity has been lost in untangling and replacing leaders.

Previously, fishing accessories have normally been carried by a fisherman in a tackle box. However, a tackle box does not prevent the fishing rigs from becoming tangled. Furthermore, fishermen frequently find it necessary to replace or change the type of fishing rig to cope with a particular situation. Such changes or replacements result in lost fishing opportunity because the tackle box is relatively inaccessible.

A fishing rig holder would eliminate the above-mentioned problems associated with the storage of fishing rigs and perform a number of most important functions for the sportsman. The holder should not only be lightweight and portable, but must be of such structure and design as to permit fishing rigs to be easily mounted on or removed therefrom. In addition, and of paramount importance, the holder should store the rigs in an extended position.

In the past, various devices have been designed to provide a means by which fishing rigs with wire or monofilament leaders can be stored or transported. These prior art devices are disclosed in U.S. Pat. No. 742,040 which has spring coils to secure the fishing rigs. U.S. Pat. No. 2,525,057 discloses a holder which crimps the hooks between the main body and head closure. U.S. Pat. No. 2,604,721 discloses a holder with staggered slots with headed bolts which receive the knot of the fishing rig. U.S. Pat. No. 2,804,717 discloses a holder with teeth on one end to receive the knot and springs on the other end to receive the hook of the fishing rig. U.S. Pat. No. 2,826,856 discloses a holder with bores on one end for receiving fishing hooks and slits on the other end for receiving the knot and a rubber band for holding the knot end securely against the holder. U.S. Pat. No. 2,917,862 discloses a multi-purpose device for fishing accessories with notches on one end and slits on the other end. U.S. Pat. No. 3,213,564 discloses a tube made of foamed polyethylene in which fish hooks can be inserted. U.S. Pat. No. 3,490,168 discloses a holder with a lining of styrofoam or cork to provide floatation. U.S. Pat. No. 4,179,834 discloses a holder with rows of hooks which stick out of the tube that receive the knot of the fishing rig. Each of these devices has had one or more inherent operational disadvantages whereby their widespread use is restricted.

The present invention has significant advantages over those shown in the prior art in that the present invention has grooves on both ends of a main body in which the fishing rigs may be attached. The grooves keep each fishing rig separate and prevent the rigs from sliding around the main body of the holder thereby becoming tangled. The grooves further make it easy to attach and remove fishing rigs from the holder. The present invention is capable of accommodating fishing rigs of different lengths. The main body can be adjusted in length by extendable members which fit together in an end-to-end relationship. The present invention is constructed from non-corrosive low density material which will float if inadvertently dropped into the water.

These and other advantages of the invention over the prior fishing rig holders will become more apparent after reading the Description and Claims which follow.

SUMMARY OF THE INVENTION

This invention is a new and improved holder for transporting and storing fishing rigs. The holder includes an extended bar with two end pieces that are attached to the respective ends of the bar. Each end piece includes a means for retaining the hook of the fishing rig and a means for retaining the knot of the fishing rig. The preferred means for retaining the hook includes a plurality of grooves located on the end piece. The preferred means for retaining the knot includes a plurality of notches located on the end piece. The grooves and notches receive the fishing rig and retain the rig in the exact location where it was attached. The rig is attached by placing the fish hook in engagement with one of the grooves and extending the rig toward the opposite end of the holder and stretching the knot over and into engagement with one of the notches. Thus, with this holder, the user can easily remove and attach the fishing rig.

In the preferred embodiment, the holder is capable of receiving fishing rigs of different lengths. The extended bar consists of a plurality of members which may be removably affixed together in an end-to-end relationship. The members are affixed by an extended tongue which slides together within the cavity of the adjacent member. The two end pieces and the extended member are removably "locked" together by a tab on the extended tongue which is received within an annular recess formed in the cavity. The bar of the holder forms a tube which is sealed at both ends.

BRIEF DESCRIPTION OF THE DRAWINGS

FIG. 1 is a perspective view of a portion of the preferred embodiment of the present invention with a fishing rig attached thereto;

FIG. 2 is an end view of the embodiment of FIG. 1 with a hook and a knot of a fishing rig attached thereto;

FIG. 3 is a partial side view of the embodiment of FIG. 1 with a hook and a knot of a fishing rig attached thereto;

FIG. 4 is a side view of the embodiment of FIG. 1 showing the extendable members;

FIG. 5 is a partial view of the extended tongue and cavity arrangement on an enlarged scale; and FIG. 6 is a partial view of alternative embodiments.

DETAILED DESCRIPTION OF THE INVENTION

Throughout the following description, reference will be made to the drawings and the same numerals will be used throughout the several views to indicate the same or like parts of the invention.

Referring specifically to FIGS. 1 and 4, the invention comprises a holder (10) for fishing rigs (20). The fishing rigs include a fish hook (12) attached to a piece of fishing line (14) some distance from the knot (16). The holder (10) includes an extended bar (30) with a first (22) end and a second (24) end and a diameter (26). A first end piece (40) and a second end piece (50) are attached to the respective ends of the extended bar.

The first end piece (40) includes a neck (28) of a diameter (32) corresponding generally to the diameter (26) of the bar and a collar portion (34) contiguous with the neck and having a diameter (36) greater than that of the bar. The collar portion includes an outer lip (38) and notch means (70) for retaining the hook of the fishing rig.

Similar to the first end piece, the second end piece (50) includes a neck (42) of a diameter (44) corresponding to the diameter (26) of the bar and a collar portion (46) contiguous with the neck having a diameter (48) greater than that of the diameter of the bar. The collar portion of the second end piece includes an outer lip (52) and a groove means (60) for retaining the knot in the line of the fishing rig.

A means for retaining the hook of the fishing rig is provided. The preferred means includes a plurality of grooves (60) located on the outer lip of the end piece. As seen best in FIG. 2, the barb of the hook is retained within a recess (54) located on the collar portion of the first end piece between the outer lip and the neck.

A means for retaining the knot in the line of the fishing rig is also provided. The preferred means includes a plurality of notches (70) located on the outer lip of the end piece. The notch is shaped to pinch the fishing line with the knot being retained within a recess (56), seen in FIG. 2; recess (56) is similar to recess (54) but is located on the collar portion of the second end piece between the outer lip and the neck.

As seen best in FIG. 4, the preferred embodiment includes first and second end pieces which have both notches (70) and grooves (60) located on the outer lips of both end pieces. This enables the fishing rigs to be attached to the holder in either direction, further facilitating easy attachment and removal of the rigs. Additionally, the rigs are kept apart on the holder thereby preventing entanglement with other rigs.

In reference specifically to FIG. 4, of the preferred embodiment, the bar (30) will have a plurality of extended members (80) which may be removably attached together in an end-to-end relationship. The feature allows the holder to be adjusted in length thereby accommodating fishing rigs of various lengths. In detail, the bar includes a cavity (62) within the first end in which an extended tongue (64) from the first end piece is shaped to permit slideable axial engagement. The second end of the bar includes an extended tongue (66) which is shaped for slideable axial engagement with the cavity (68) formed within the second end piece. Further, each of the extended members includes a cavity (68) on one end and an extended tongue (66) on the other end which permits slideable axial engagement to the cavity of an adjacent member. Two, three, four or more such members (80) can be affixed together between a pair of end caps. Larger fishing rigs, such as are used for ocean fishing will typically require a longer overall holder length.

In reference to FGIS. 4 and 5, the first and second end pieces are attached to the bar by a tab (90) which extends outwardly from the extended tongue which is positioned for engagement within a corresponding annular recess (82) formed within the cavity. As seen best in FIG. 5, the extended members (80) of the bar (30) are also attached by a similar tab on the extended tongue of each member being engaged in a correspondingly annular recess with the cavity of an adjacent member. This tab (90) and annular recess (82) arrangement permits the end pieces (40 and 50) and the extended members (80) of the bar (30) to be attached in removably locked fashion without aligning each component. This makes the holder easy to assemble and permits the length of the hold to be quickly adjusted.

Another aspect of the preferred embodiment is best seen in FIGS. 1 and 4. The bar of the holder forms a tube (84) which is sealed at both ends thereby creating a bounded volume within the sealed tube. The holder is made of a noncorrosive material having a density less than water, preferably poly vinyl chloride or the like. Since the tube is sealed, the holder will not fill up with water if dropped into the water. Further, because the holder will float, it can easily be retrieved if accidently dropped into the water.

Preferably, the size of the holder is such that the two end pieces are of a distance so that the overall length the holder is slightly greater than the distance between the hook and the knot of the fishing rig. Alternatively, rigs of roughly twice the length of the holder may be stored by affixing the hook and knot to the same end piece and wrapping the midsection of the rig about a portion of the opposite end cap.

Turning now to FIG. 6, an alternative embodiment is disclosed. This version of the invention includes a cavity (96) formed within both the first end piece and the second end piece. (Only the first end piece is shown, but in this embodiment both end pieces are identical.) The bar (98) is shaped for slideable axial engagement with the cavity formed within both the first and the second end pieces. The device is constructed by cutting a piece of hollow bar stock to the desired length and affixing an end piece to each end of the bar. This creates a hollow bounded volume with air trapped inside. If the device is constructed of poly vinyl chloride, suitable glue can be used to make a permanent bond. If desired, the bounded volume may be filled with a foam, such as styrofoam or other low density material.

In reference again to FIG. 6, a second alternative embodiment is disclosed. In this version of the invention, a foam sleeve (100) surrounds the bar. The hook of the fishing rig may be inserted into the foam sleeve. This provides safety advantages such as burying the barb of the hook in the foam. Further, the sleeve allows fishing rigs of any length to be stored on the holder as the fishing line may be wrapped around the bar. Additionally, the foam sleeve provides additional flotation.

Method of Use

As can be readily understood from the above-description and the drawings, an advantageous method of using the present invention exists. As described above, the invention comprises a holder (10) for fishing rigs (20). The fishing rigs include a fish hook (12) attached to a piece of fishing line (14) some distance from the knot (16). The holder (10) includes an extended bar (30) with a first (22) end and a second (24) end and a diameter (26). A first end piece (40) and a second end piece (50) are attached to the respective ends of the extended bar. The preferred means for retaining the hook of the fishing rig includes a plurality of grooves (60) located on the outer lip of the end piece. The preferred means for retaining the knot of the fishing rig includes a plurality of notches (70) located on the outer lip of the end piece. In an alternative embodiment, a foam sleeve, surrounds the bar.

The holder is used by attaching the hook of the fishing rig to a groove located on the outer lip (38) of the first end piece. The barb of the hook is retained within the recess (54) on the end piece. The user then stretches the fishing line along the extended bar towards the second end piece. The user then inserts the knot of the fishing rig in the notch located on the outer lip (52) of the second end piece. The fishing line is pinched in the notch while the knot is retained within a recess (56) on the second end piece. The fishing rig will be securely attached to the holder. To remove the fishing rig, the user may repeat the steps in reverse order.

Alternatively, with the embodiment with the foam sleeve, (100) the user may insert the knot of the fishing rig into notch located on the outer lip of the first end piece. The user then stretches the fishing line along the extended bar towards the second end piece. The user then inserts the hook of the fishing rig into the foam sleeve which surrounds the bar. The foam may be of a closed cell type such as the Ethafoam brand widely available. If the fishing line is longer than the length of the holder, the user may fold the fishing line over the second end piece before inserting the hook into the sleeve. The foam covers and surrounds the hook, which is inserted in the foam. This provides significant safety advantages. Further, the foam is a cushion and provides additional flotation.

The alternative embodiments of the invention are used in analagous ways as can be understood from the above-description and reference to the drawings. In light of the above teachings it will be appreciated that several variations of the disclosed embodiments are possible. Those skilled in the art will no doubt be able to utilize the principles of this invention other than as specifically described above. Certainly substitution of other materials and variations of the relationships of size and positioning of components within the teachings of this disclosure will be readily known. Therefore, it is to be understood that the scope of the invention is to be limited by the following claims.

What is claimed is:

1. A holder for fishing rigs, said rigs including a fish hook attached to an extended piece of fishing line and including a knot or loop tied in said line at a distance from said hook, said holder comprising:
   an extended bar member having first and second spaced apart ends and having a diameter;
   a first end piece affixed to said first end of said bar at said first end and including a neck member of a diameter corresponding generally to the diameter of said bar and a collar portion contiguous with said neck member and having a diameter greater than said diameter of said bar, said collar portion, having an outer lip and including a means for retaining said hook of said rigs; and
   a second end piece affixed to said second end of said bar at said second end and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs;
   wherein said first end piece further includes a notch located on said outer lip of said first end piece and sized and shaped to pinch the fishing line of second fishing rig with the knot of said second rig retained within said recess of said first end piece, and said second end piece further includes a groove located on said outer lip of said second end piece and sized to receive said hook with the barb of said hook within said recess of said second end piece.

2. The holder of claim 1, wherein said means for retaining said hook comprises a groove located on said outer lip of said first end piece and for retaining said hook with the barb of said hook within a recess located on said collar portion of said first end piece between said outer lip and said neck member.

3. The holder of claim 2, wherein said means for retaining said knot comprises a notch located on said outer lip of said second end piece and sized and shaped to pinch the fishing line with said knot retained within a recess located on said collar of said second end piece between said outer lip and said neck member.

4. A holder for fishing rigs, said rigs including a fish hook attached to an extended piece of fishing line and including a knot or loop tied in said line at a distance from said hook, said holder comprising:
   an extended bar member having first and second spaced apart ends and having a diameter; wherein said bar comprises a plurality of extended members having ends and removably affixed together in end-to-end relationship;
   a first end piece affixed to said first end of said bar at said first end and including a neck member of a diameter corresponding generally to the diameter of said bar and a collar portion contiguous with said neck member and having a diameter greater than said diameter of said bar, said collar portion, having an outer lip and including a means for retaining said hook of said rigs; and
   a second end piece affixed to said second end of said bar at said second end and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs.

5. The holder of claim 4, wherein said bar further includes a cavity formed within said first end and said first end piece includes an extended tongue conformed for slidable axial engagement with said cavity formed within said first end.

6. The holder of claim 5, wherein said bar further includes an extended tongue affixed to said second end and said second end piece includes a cavity formed for slidable axial engagement with said extended tongue of said second end.

7. The holder of claim 4, wherein each of said extended members includes a cavity formed within one end thereof and an extended tongue conformed for slidable axial engagement with said cavity of an adjacent member.

8. The holder of claim 6, wherein said bar further includes a tab extending outwardly from said extended tongue and positioned for engagement with a corresponding annular recess formed in said cavity.

9. The holder of claim 4, wherein said bar further comprises a tube sealed at said ends and confining a material having a density substantially less than that of water within the bounded volume of said sealed tube.

10. The holder of claim 4, wherein said bar and said end pieces are constructed of a poly vinyl chloride material having a density less than that of water.

11. The holder of claim 4, wherein the length of bar is sufficient to place the outer lip of said first end piece a distance from the outer lip of said second end piece which is slightly greater than the distance between the end of the hook of a rig of a given length and the knot on the opposite end of said rig.

12. A holder for fishing rigs, said rigs including a fish hook attached to an extended piece of fishing line and including a knot or loop tied in said line at a distance from said hook, said holder comprising:
   an extended bar member having first and second spaced apart ends and having a diameter;
   a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs, wherein said means for retaining said hook comprises a groove located on said outer lip of said first end piece which retains said hook with the barb of said hook within a recess located on said collar portion of said first end piece between said outer lip and said neck member; and
   a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs, wherein said means for retaining said knot comprises a notch located on said outer lip of said second end piece and sized and shaped to pinch the fishing line with said knot retained within a recess located on said collar portion of said second piece between said outer lip and neck member;
   wherein said first end piece further includes a notch located on said outer lip of said first end piece and sized and shaped to pinch the fishing line of a second fishing rig with the knot of said second rig retained within said recess of said first end piece, and said second end piece further includes a groove located on said outer lip of said second end piece and sized to receive said hook with the barb of said hook within said recess of said second end piece.

13. A holder for fishing rigs, said rigs including a fish hook attached to an extended piece of fishing line and including a knot or loop tied in said line at a distance from said hook, said holder comprising:
   an extended bar member having first and second spaced apart ends and having a diameter, wherein said bar comprises a plurality of extended members having ends and removably affixed together in end-to-end relationship;
   a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs; and
   a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs.

14. A holder for fishing rigs, said rigs including a fish hook attached to an extended piece of fishing line and including a knot or loop tied in said line at a distance from said hook, said holder comprising:
   an extended bar member having first and second spaced apart ends and having a diameter;
   a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs; and
   a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs;
   wherein said bar further includes a tab extending outwardly from said bar and positioned for engagement with a correspondingly annular recess formed within the first end piece and the second end piece.

15. The holder of claim 14, wherein said bar comprises a tube, sealed at said ends and confining a material having a density substantially less than that of water within the bounded volume of said sealed tube.

16. The holder of claim 15, wherein said bar and said end pieces are constructed of a poly vinyl chloride material having a density less than that of water.

17. The holder of claim 16, wherein the length of said bar is sufficient to place the outer lip of said first end piece a distance from the outer lip of said second end piece which is slightly greater than the distance between the end of the hook of a rig of a given length and the knot on the opposite end of said rig.

18. A holder for fishing rigs, said rigs including a fish hook attached to an extended piece of fishing line and including a knot or loop tied in said line at a distance from said hook, said holder comprising:
   an extended bar member having first and second spaced apart ends and having a diameter;

a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs, wherein said means for retaining said hook comprises a groove located on said outer lip of said first end piece which retains said hook with the barb of said hook within a recess located on said collar portion of said first end piece between said outer lip and said neck member;

a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs, wherein said means for retaining said knot comprises a notch located on said outer lip of said second end piece and sized and shaped to pinch the fishing line with said knot retained within a recess located on said collar portion of said second end piece between said outer lip and neck member; and a foam sleeve surrounding said bar having a length corresponding generally to the length of said bar;

wherein said first end piece further includes a notch located on said outer lip of said first end piece and sized and shaped to pinch the fishing line of a second fishing rig with the knot of said second rig retained within said recess of said first end piece, and said second end piece further includes a groove located on said outer lip of said second end piece and sized to receive said hook with the barb of said hook within said recess of said second end piece.

19. A holder for fishing rigs, said rigs including a fish hook attached to an extended piece of fishing line and including a knot or loop tied in said line at a distance from said hook, said holder comprising:

an extended bar member having first and second spaced apart ends and having a diameter, wherein said bar comprises a plurality of extended members having ends and removably affixed together in end-to-end relationship;

a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs;

a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs; and a foam sleeve surrounding said bar having a length corresponding generally to the length of said bar.

20. A holder for fishing rigs, said rigs including a fish hook attached to an extended piece of fishing line and including a not or loop tied in said line at a distance from said hook, said holder comprising:

an extended bar member having first and second spaced apart ends and having a diameter;

a first end piece affixed to said first end of said bar at said first end having a cavity formed within said first end piece and including a neck member of a diameter corresponding generally to the diameter of said bar and a collar portion contiguous with said neck member and having a diameter greater than said diameter of said bar, said collar portion, having an outer lip and including a means for retaining said hook of said rigs;

a second end piece affixed to said second end of said bar at said second end having a cavity formed within said second end piece and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs; and a foam sleeve surroundng said bar having a length corresponding generally to the length of said bar;

wherein said bar further includes a tab extending outwardly from said bar and positioned for engagement with a correspondingly annular recess formed within the first end piece and the second end piece.

21. The holder of claim 20, wherein said bar comprises a tube, sealed at said ends and confining a material having a density substantially less than that of water within the bounded volume of said sealed tube.

22. The holder of claim 21, wherein said bar and said end pieces are constructed of a poly vinyl chloride material having a density less than that of water.

23. The holder of claim 22, wherein the length of said bar is sufficient to place the outer lip of said first end piece a distance from the outer lip of said second end piece which is slightly greater than the distance between the end of the hook of a rig of a given length and the knot on the opposite end of said rig.

24. The holder of claim 23, wherein said sleeve is constructed of a closed cell foam material.

25. A method of using a holder for fishing rigs, said rigs including a fish hook attached to an extended piece of fishing line and including a knot or loop tied in said line at a distance from said hook, said holder comprising:

an extended bar member having first and second spaced apart ends and having a diameter;

a first end piece affixed to said first end of aid bar at said first end and including a neck member of a diameter corresponding generally to the diameter of said bar and a collar portion contiguous with said neck member and having a diameter greater than said diameter of said bar, said collar portion, having an outer lip and including a means for retaining said hook of said rigs; and a second end piece affixed to said second end of said bar at said second end and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs, said means for retaining said hook comprises a groove located on said outer lip of said first end piece and a recess located on said collar portion of said first end piece, said means for retaining said knot comprises a notch located on said outer lip of said second end piece and a recess located on said collar portion of said second end piece;

a notch located on said outer lip of said first end piece and a groove located on said outer lip of said second end piece and the length of the bar and first and second end pieces is slightly greater than the length of said rig;

said method comprising the steps of:
(a) affixing said first end piece to said first end of said bar;
(b) affixing said second end piece to said second end of said bar;
(c) attaching the hook of said fishing rig to the groove located on the outer lip of said first end piece so that the barb of said hook is within a recess on said first end piece;
(d) stretching the fishing line of said fishing rig along the extended bar towards the second end piece; and
(e) inserting the knot of said fishing rig into the notch located on the outer lip of said second end piece so that the line is pinched with said knot retained within a recess on said second end piece.

26. The method of claim 25, wherein said holder further includes the bar having a cavity formed on one end and an extended member formed on the opposite end and said end pieces respectively include a corresponding extended tongue and a cavity, said extended tongues having a tab extending outwardly therefrom at the end thereof, said cavities including a annular recess for engaging said tab, further comprising the steps of:
inserting said extended tongue of said first end piece into said cavity of said bar and engaging said tab within said recess, and
inserting said extended tongue of said bar into said cavity of said second end piece and engaging said tab within said recess.

27. A method of using a holder for fishing rigs, said rigs including a fish hook attached to an extended piece of fishing line and including a knot or loop tied in said line at a distance from said hook, said holder comprising:
an extended bar member having first and second spaced apart ends and having a diameter;
a first end piece affixed to said first end of said bar at said first end and including a neck member of a diameter corresponding generally to the diameter of said bar and a collar portion contiguous with said neck member and having a diameter greater than said diameter of said bar, said collar portion, having an outer lip and including a means for retaining said hook of said rigs;
a second end piece affixed to said second end of said bar at said second end and including a neck member of a diameter corresponding generally to the diameter of said bar and a collar portion contiguous with said neck member and having a diameter greater than said diameter of said bar, said collar portion of said second end piece including an outer lip and having a means for retaining said knot of said rigs; and
a foam sleeve surrounding said bar having a length corresponding generally to the length of said bar;
said means for retaining said hook comprises a groove located on said outer lip of said first end piece and a recess located on said collar portion of said first end piece, said means for retaining said knot comprises a notch located on said outer lip of said second end piece and a recess located on said collar portion of said second end piece;
a notch located on said outer lip of said first end piece and a groove located on said outer lip of said second end piece and the length of the bar and first and second end pieces is slightly greater than the length of said rig;
said method comprising the steps of:
(a) affixing said first end piece to said first end of said bar;
(b) affixing said second end piece to said second end of said bar;
(c) inserting the knot of said fishing rig into the notch located on the outer lip of said first end piece so that the line is pinched with said knot retained within a recess on said first end piece;
(d) stretching the fishing line of said fishing rig along the extended bar towards the second end piece; and
(e) inserting the hook of said fishing rig into the sleeve which surrounds said bar so that the barb of said hook is within said sleeve.

28. The method of claim 27, wherein said holder further includes the bar having a cavity formed on one end and an extended member formed on the opposite end and said end pieces respectively include a corresponding extended tongue and a cavity, said extended tongues having a tab extending outwardly therefrom at the end thereof, said cavities including a annular recess for engaging said tab, further comprising the steps of:
inserting said extended tongue of said first end piece into said cavity of said bar and engaging said tab within said recess, and
inserting said extended tongue of said bar into said cavity of said second end piece and engaging said tab within said recess.

* * * * *